(12) United States Patent
Wilson

(10) Patent No.: US 6,167,849 B1
(45) Date of Patent: Jan. 2, 2001

(54) CRANKCASE BREATHER OIL COLLECTOR FOR MOTORCYCLES

(76) Inventor: Robert L. Wilson, P.O. Box 610, Camp Verde, AZ (US) 86322

( * ) Notice: Under 35 U.S.C. 154(b), the term of this patent shall be extended for 0 days.

(21) Appl. No.: 09/332,504

(22) Filed: Jun. 14, 1999

Related U.S. Application Data

(60) Provisional application No. 60/090,450, filed on Jun. 24, 1998.

(51) Int. Cl.$^7$ .................................................. F02M 25/06
(52) U.S. Cl. ....................................... 123/41.86; 123/572
(58) Field of Search ................................... 123/572, 573, 123/574, 41.86

(56) References Cited

U.S. PATENT DOCUMENTS

| | | | |
|---|---|---|---|
| 3,834,365 | * 9/1974 | Ussery | 123/572 |
| 4,453,525 | * 6/1984 | Debruler | 123/572 |
| 4,627,406 | * 12/1986 | Namiki et al. | 123/572 |
| 4,646,701 | 3/1987 | Fukumoto . | |
| 4,727,955 | 3/1988 | Honda . | |
| 5,072,713 | * 12/1991 | Sweeten | 123/572 |
| 5,183,023 | 2/1993 | Hanson . | |
| 5,205,243 | * 4/1993 | Buchholz | 123/572 |
| 5,373,830 | 12/1994 | Denz et al. . | |
| 5,499,616 | * 3/1996 | Enright | 123/572 |
| 5,562,087 | * 10/1996 | Wright | 123/572 |
| 5,562,757 | 10/1996 | Brun et al. . | |
| 5,718,209 | 2/1998 | Scardino et al. . | |

FOREIGN PATENT DOCUMENTS

| 4119794 | 12/1992 | (DE) . |
|---|---|---|
| 2571825 | 4/1986 | (FR) . |

* cited by examiner

*Primary Examiner*—Marguerite McMahon
(74) *Attorney, Agent, or Firm*—Richard C. Litman

(57) ABSTRACT

A crankcase breather oil collector serves to capture oil vapor mixed with crankcase blowby gases, and contain the oil vapor to preclude its exiting to the atmosphere and/or collecting on external machinery components. The device basically comprises a canister which communicates with the crankcase of a four stroke reciprocating internal combustion engine by a tube or line. blowby gases and oil vapor mixed therewith are routed to the canister by the tube or line, with the oil vapor cooling and falling out of suspension with the blowby gases to condense and collect as a liquid in the bottom of the canister. The blowby gases then exit the canister through a filtered vent or outlet. The outlet filter serves to preclude significant particulate matter from being expelled to the ambient atmosphere, and also serves to protect the engine by precluding the entrance of airborne contaminants to the engine when the engine is shut down and cools to provide a relatively low pressure within the crankcase. The oil collected within the canister may be drained by a petcock or drain valve for periodic proper disposal as required. While the present oil collector may be adapted to virtually any type of four stroke reciprocating internal combustion engine not having a positive crankcase ventilation system, it is particularly well suited for use with motorcycles, which are not required to have any form of emissions controls thereon.

12 Claims, 4 Drawing Sheets

CRANKCASE BREATHER OIL COLLECTOR FOR MOTORCYCLES

REFERENCE TO RELATED PATENT APPLICATION

This application claims the benefit of U.S. Provisional Patent Application Serial No. 60/090,450, filed on Jun. 24, 1998.

BACKGROUND OF THE INVENTION

1. Field of the Invention

The present invention relates generally to systems and devices for precluding the discharge of oil from lubricated mechanisms, and more specifically to a collector for capturing oil mist and vapor discharged from the crankcase breather of a four stroke (Otto cycle) internal combustion engine. The device comprises a container and filtered exhaust, with the crankcase breather line being connected to an inlet on the container. The present invention is particularly well suited for use with motorcycles having four stroke internal combustion engine power, as such vehicles are not required to have other emission control means of capturing crankcase oil vapor.

2. Description of the Related Art

All four stroke (Otto cycle) reciprocating internal combustion engines produce at least some "blowby" due to the relatively high pressures occurring in the combustion chamber(s) during the compression and power strokes of the engine while it is operating. While the piston(s) is/are normally reasonably well sealed by means of their compression and oil control rings, there will nevertheless always be some compression and combustion pressure which escapes the combustion chamber(s) past the rings and ring gaps, and finds its way to the crankcase of the engine.

The turbulence within the crankcase, due to the spinning of the crankshaft and its throw(s) with the lower end(s) of the connecting rod(s) attached thereto, along with the spray of return oil from various components in the engine, results in a considerable amount of warm oil vapor being contained within the crankcase during engine operation. This blowby gas, with its oil vapor byproduct, must be released from the crankcase in some manner, in order to preclude the blowing out of crankshaft or other seals within the engine.

It has been standard practice for many years on automobiles to run a tube from the crankcase (and valve cover) vent(s), back to the intake system of the vehicle, where the expelled crankcase gases are recycled through the combustion chambers of the engine for combustion. This crankcase ventilation system was the earliest form of emissions control provided on automobiles. Increasing emissions control requirements over the years have led to further emissions control equipment being required for automobiles.

However, due to the weight, bulk, and engine inefficiencies of such emissions control equipment, no emissions control requirements have ever been established for motorcycles. As there are relatively few motorcycles on the road in comparison with automobiles, and motorcycles are generally equipped with relatively smaller engines which put out fewer pollutants than automobile engines, it has generally not been considered to be worthwhile to require such emissions controls (including crankcase ventilation systems) for motorcycles.

Accordingly, crankcase vapors have conventionally been vented to ambient atmosphere during operation of motorcycle engines. The amount of blowby gas and oil vapor is relatively small, but nevertheless some combustion gases and oil vapor are distributed to the atmosphere during the operation of the typical motorcycle, with larger motorcycles with bigger engines contributing a relatively greater share of such gases and vapors. While such gases and oil vapors are an extremely minor part of any contribution to atmospheric pollution, the oil vapors escaping from the crankcase breather tube of such an engine can nevertheless contaminate the immediate area of the motorcycle, by spraying upon various components of the motorcycle. As the oil vapor contacts relatively cooler components on the motorcycle, it will tend to condense and produce an oily film on components downstream of the breather outlet. The film tends to collect dust and dirt, and an otherwise clean motorcycle can become quite grimy and dirty after a road trip of any duration. This is a continually frustrating experience for the typical motorcycle owner who takes pride in his or her machine, with the owner being required to clean the motorcycle after nearly every operation of the machine in order to remove the oil dispensed by the crankcase breather of the motorcycle.

Accordingly, a need will be seen for some means of collecting and retaining oil vapor from a motorcycle engine, which otherwise would be sprayed or distributed over the exterior of the motorcycle during operation of the machine. The oil vapor collecting and retaining means must provide for the positive capture of all vapors emanating from the crankcase breather system, and must also provide for the routing of blowby gases from the collector system after oil has been removed from the gases. The gases may be filtered in order to preclude the passage of any significant amounts of particulate or liquid discharge to the atmosphere.

A discussion of the related art of which the present inventor is aware, and its differences and distinctions from the present invention, is provided below.

U.S. Pat. No. 4,646,701 issued on Mar. 3, 1987 to Tsunenori Fukumoto, titled "Evaporation Fuel Processing Apparatus For Two-Wheel Vehicle," describes a closed fuel vapor capture system for motorcycles. The fuel vapors are absorbed within an activated charcoal canister, where they are contained until venting into the intake manifold of the engine during engine operation. The present system is open, rather than being closed, and serves to capture oil (not fuel) as it is expelled from the crankcase breather, along with other crankcase gases. The liquid captured by the present system is not rerouted to the engine for recycling, but is retained in a canister for periodic disposal as required.

U.S. Pat. No. 4,727,955 issued on Mar. 1, 1988 to Masazi Honda et al., titled "Carbon Canister Drained Vapor Diffusing Device," describes a fuel vapor control system in which vapors are released from a canister to a closed channel front subframe member of an automobile. The vapors are then dissipated through passages in the subframe member to the atmosphere. The Honda et al. invention is the provision of a small secondary plenum relatively well removed from the passenger compartment of the vehicle, for accepting the fuel vapors from the canister and dissipating the vapors relatively far away from the passenger compartment in order to minimize fuel odors in the passenger compartment. No mention is made of any means of capturing oil vapor from crankcase blowby gases, or separating liquid oil from blowby gases and dispensing the blowby gases while retaining the oil, as provided by the present invention.

U.S. Pat. No. 5,183,023 issued on Feb. 2, 1993 to John D. Hanson, titled "Evaporative Emission Control System For Supercharged Internal Combustion Engine," describes a fuel vapor control system in which two lines are provided from the canister to the intake system of the vehicle. The two lines route fuel vapors to the engine either upstream or downstream of the supercharger, depending upon whether the engine is operating at a manifold pressure of more or less than ambient atmospheric pressure. Hanson does not disclose any means of capturing oil vapor from crankcase blowby gases, as provided by the present invention.

U.S. Pat. No. 5,373,830 issued on Dec. 20, 1994 to Helmut Denz et al., titled "Breather For An Internal Combustion Engine Fuel Tank," describes a fuel vapor capture system including at least one pressure relief valve for venting pressure to ambient in the event the fuel vapor pressure in the system reaches a predetermined point, in order to relieve the pressure before blowout damage to the system occurs. The Denz et al. system is closed until a predetermined pressure is reached, whereupon the pressure relief valve opens. The present system is open to ambient atmospheric pressure at all times. Denz et al. are silent regarding any means of capturing oil vapor from crankcase breather gases, as provided by the present invention.

U.S. Pat. No. 5,562,757 issued on Oct. 8, 1996 to Francois Brun et al., titled "Device For Recovering the Vapors Leaving A Motor Vehicle Gasoline Tank," describes a gasoline vapor purge system in which vapors are drawn from both the canister atmospheric vent line and canister intake manifold vent line. This has the effect of reducing the richness of the fuel mixture being drawn into the intake manifold, thereby providing better engine operation during the canister purge operation. Brun et al. are silent regarding any means of venting crankcase vapors, or of recovering oil vapor or droplets ejected from the crankcase breather system, which functions are provided by the present invention.

U.S. Pat. No. 5,718,209 issued on Feb. 17, 1998 to Eileen A. Scardino et al., titled "Fuel Vapor Storage Canister," describes a fuel vapor canister having a screen between the activated charcoal vapor absorbent material and the purge line to the intake manifold of the engine. The screen is positively sealed in place so that it cannot be dislodged, which could allow carbon granules to be drawn into the solenoid valve if the screen were to become dislodged. The present oil recovery canister does not rely upon any vacuum or pressure differential between the engine manifold and the canister, nor does it directly involve the fuel system in any way. Scardino et al. do not disclose any means of recovering oil vapor from the crankcase breather system in a collection canister, as provided by the present invention.

French Patent Publication No. 2,571,825 published on Apr. 18, 1986 illustrates a device for spraying mechanical components with a liquid, such as oil. According to the English abstract, the components are housed within a closed box, and excess oil is returned to a separator with the oil being routed to a container and air passing to the ambient atmosphere. The system is essentially opposite that of the present invention, as the French device draws the oil, and any air therein, from the bottom of the closed box, where the oil would be in an essentially liquid state before further processing. Also, the French device passes the oil and air through a filter first, before passing the oil to a container. The filter of the present invention is at the air outlet of the device, with essentially no oil reaching the filter.

Finally, German Patent Publication No. 4,119,794 published on Dec. 17, 1992 illustrates an oil separator for an internal combustion engine. The system appears to be adapted for the removal of oil vapor which has been distributed by a supercharger or turbocharger, in which oil may have leaked past bearings into the intake system. No disclosure is apparent regarding any collection of oil from the crankcase breather vapors from the engine, as provided by the present invention.

None of the above inventions and patents, taken either singly or in combination, is seen to describe the instant invention as claimed.

SUMMARY OF THE INVENTION

The present invention comprises a crankcase breather oil collector for motorcycles, with the device serving to capture oil vapor which has been expelled from the crankcase along with blowby gases from the crankcase. The crankcase communicates with the canister or container of the present collector by means of a tube, with the container also having a filtered outlet thereon. Blowby gases and oil vapor mixed therein enter the container, with the relatively heavier oil vapor collecting in the bottom of the container and lighter blowby gases passing through the filter to exit to the atmosphere. Oil may be drained from the container periodically by means of a petcock or drain valve in the bottom of the container. The filter also serves to prevent unfiltered air from entering the system when the engine is shut down.

Accordingly, it is a principal object of the invention to provide an improved crankcase breather oil collector for use with four stroke reciprocating internal combustion engines, and which is particularly well adapted for use with motorcycles having such engines.

It is another object of the invention to provide an improved crankcase breather oil collector which serves to preclude the escape of oil vapor from the crankcase breather and the subsequent deposit of such oil vapor onto components of the motorcycle and/or into the atmosphere.

It is a further object of the invention to provide an improved crankcase breather oil collector which collects oil expelled from the crankcase breather for later draining from the collector and disposal.

An additional object of the invention is to provide an improved crankcase breather oil collector including a filter for gases exiting the collector, for precluding the expulsion of significant particulate matter from the collector and for precluding the entrance of contaminants from the atmosphere into the system when the engine is shut down.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
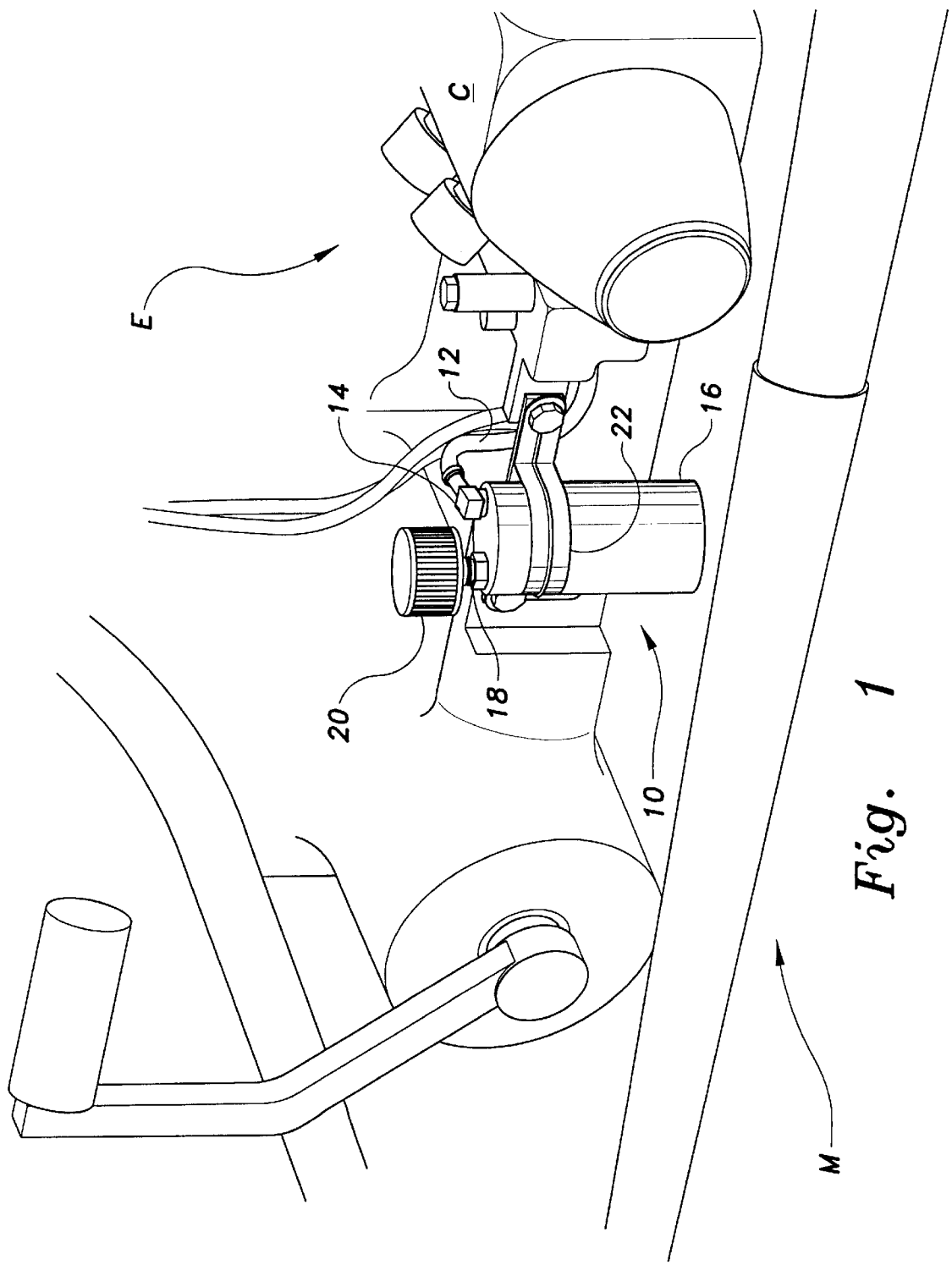
FIG. 1 is an environmental perspective view of the present crankcase breather oil collector shown in an exemplary installation on a motorcycle.

The present invention comprises a crankcase breather oil collector, indicated by the reference numeral 10 throughout the drawing figures. FIG. 1 provides an environmental view of the present collector 10 installed on a motorcycle M, where it is connected to the crankcase C of the engine E. As noted in the discussion of the present invention above in the Background of the Invention portion of the present disclosure, all four stroke reciprocating internal combustion engines produce some blowby gases due to the escape of air and combustion gases past the piston rings during the compression and power strokes of the engine. These gases must be dealt with in order to avoid pressurizing the crankcase of the engine and blowing out crankshaft seals or causing other damage to the engine.

Accordingly, all such engines are provided with a crankcase breather, which permits such pressurized gases to escape. Automobile engines route the blowby gases back to the intake manifold for recycling through the combustion process. Motorcycles are exempt from such emissions control requirements, and conventionally vent such blowby gases to the atmosphere. These blowby gases also contain some residual oil vapor, primarily picked up in the crankcase due to the turbulence of the oil therein caused by the rapid rotation of the crankshaft and lower connecting rod ends within the case, the spray of lubricating oil returning to the crankcase from other portions of the engine, etc.

It will be seen that the venting overboard of blowby gases containing residual oil vapors, will lead to the oil collecting on anything which is located downstream in the airflow beyond the breather tube outlet, unless the oil is collected in some manner. Accordingly, the crankcase breather tube 12 is routed to an inlet fitting 14 which extends into a canister 16 of the present collector 10. An outlet pipe 18 allows blowby gases to escape from the canister 16 through a filter 20, before passing to the atmosphere. The oil vapor which was entrained in the blowby gases, tends to condense to its liquid state within the relatively cool canister 16, and thus collects within the canister 16 to be drained periodically and disposed of as required. The canister 16 may be secured to the structure of the motorcycle M by means of a clamp 22.

Figure 2:
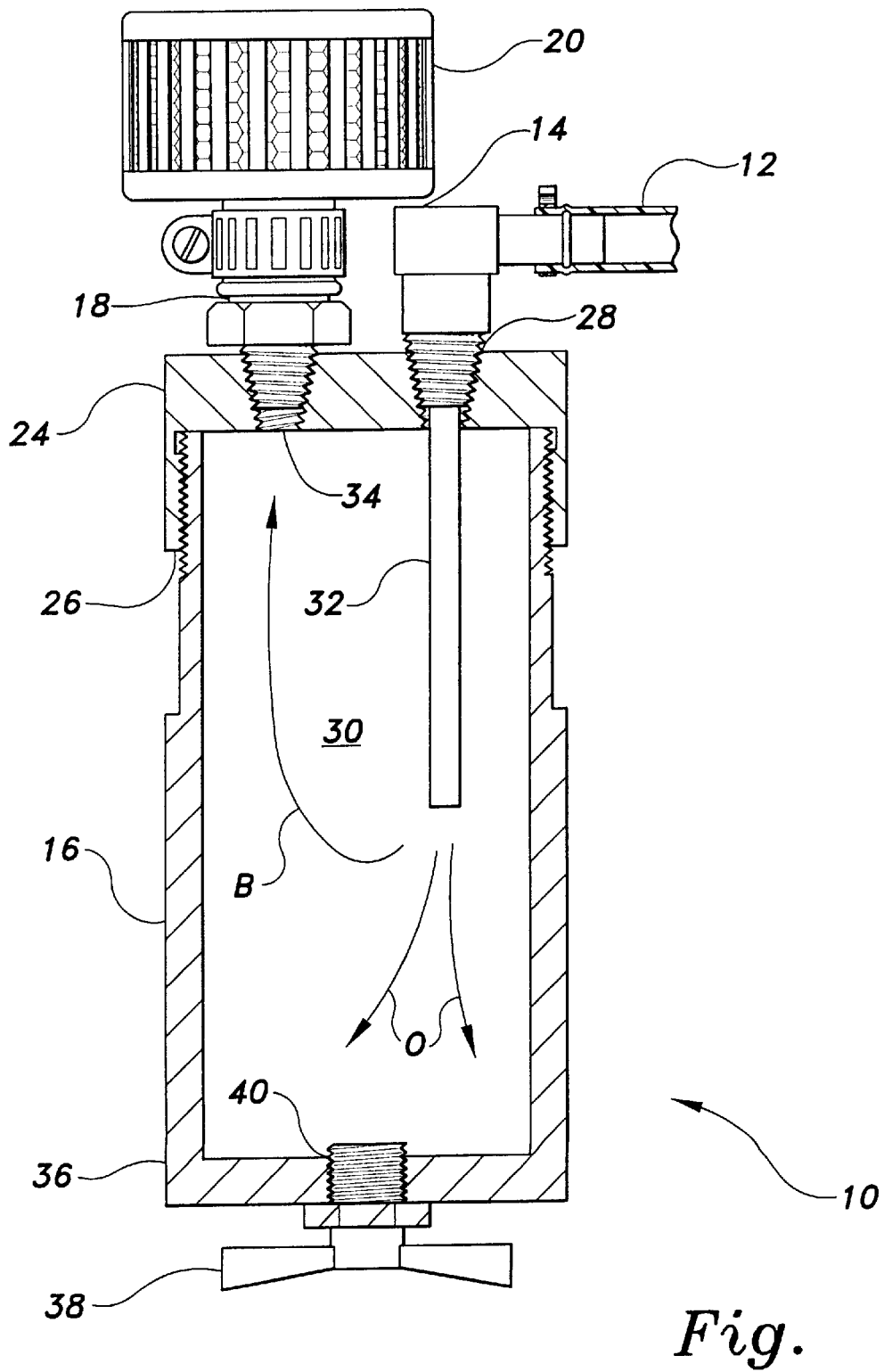
FIG. 2 is an elevation view in section of the present oil collector, showing its components and flow therethrough.

FIG. 2 provides a detailed view of the internal structure of the present container 10. It will be seen in FIG. 2 that the canister 16 is actually formed as two components, with the base portion comprising the main body of the canister 16 and a separate upper portion or top 24 being secured to the base portion, as by mating threads 26 or other suitable means. The inlet fitting 14 passes through an appropriately configured passage in the top 24 of the canister 16 (e. g., tapered pipe threads 28, etc.) to provide communication between the breather tube or line 12 and the hollow interior 30 of the canister 16. An internal inlet pipe 32 may extend downwardly into the interior 30 of the canister 16, to about one half the height or depth of the canister 16. This delivers the blowby gases and entrained oil to the interior 30 of the canister 16, at a point well removed from the internal opening 34 to the upper outlet pipe 18, to reduce substantially the amount of oil vapor which remains in the blowby gases as they travel through the canister 16.

The relatively heavier oil droplets will tend to gravitate toward the bottom end 36 of the canister 16, as indicated by the directional arrows O indicating the general path of such oil droplets. Also, as the collector 10 is exposed to ambient temperatures in its preferred installed location on the exterior of the motorcycle M, cooling airflow will tend to cool the canister 16, thereby further condensing the oil vapor therein and causing it to pool or collect in the bottom portion 36 of the canister 16.

The blowby gases, largely depleted of oil, escape from the canister 16 through the outlet pipe or tube 18 to the atmosphere, as generally indicated by the blowby gas arrow B in FIG. 2, through the filter 20. The filter 20 may serve to capture some residual oil vapor still entrained within the blowby gases, which will then tend to run back into the interior 30 of the canister 16 to collect in the bottom portion 36 thereof with other oil collected. The filter 20 also serves to preclude passage of any substantial particulate matter from the engine E and crankcase C to the atmosphere as well. The filter 20 is preferably removably installed on the outlet pipe 18 (e. g., "squeeze" or hose clamp, etc.), for removal for cleaning and replacement as required.

However, one important function of the filter 20 is to preclude the entrance of dust and other contaminants from the atmosphere, back into the canister 16 and thence into the crankcase C of the engine E by means of the breather tube 12, when the engine E is not in operation. It is essential that any internal combustion engine be kept as clean as possible internally, due to the very close tolerances between moving parts in such engines. When the engine E is shut down, the gases remaining within the crankcase C will cool and contract, thus drawing ambient air into the crankcase C through the breather tube 12 and canister 16. The filter 20 filters this air, thus preventing dust and other contaminants from entering the crankcase C and becoming mixed with the oil therein, and possibly damaging the engine E when it is later operated.

Preferably, the canister 16 portion of the container 10 is of a sufficient size to contain a reasonable amount of blowby oil therein. An internal diameter of about 1.35 inches and an internal height of about three inches, provides an internal volume of about two and three eighths fluid ounces (excluding the volume required for the internal inlet pipe 32 within the canister 16). Typical oil consumption of a large motorcycle engine E, is only on the order of about one ounce for every two to five hours of operation (with a great deal of variation in consumption between individual engines, depending upon their specific tolerances and clearances, the weight or viscosity of the oil being used, the type of engine operation, i. e., low or high speed, etc.). Thus, the canister 16 will become filled with oil only after at least a few hours of engine operation. It will be seen that other sizes of canisters may be provided as desired to provide a greater internal volume. However, the present canister 16 provides a reasonable volume, and is quite compact for ease of installation.

After a few hours of engine operation, the operator may drain any residual oil collected within the internal volume 30 of the canister 16, by opening the petcock or drain valve 38 which is threaded through a passage 40 in the bottom portion 36 of the canister 16. The oil may be drained into an appropriate container for proper disposal, in order to avoid polluting or contaminating the environment. This operation requires only a minute or so, with the motorcycle then being ready to run for at least a few to several hours, before the canister 16 must be drained again.

Figure 3:
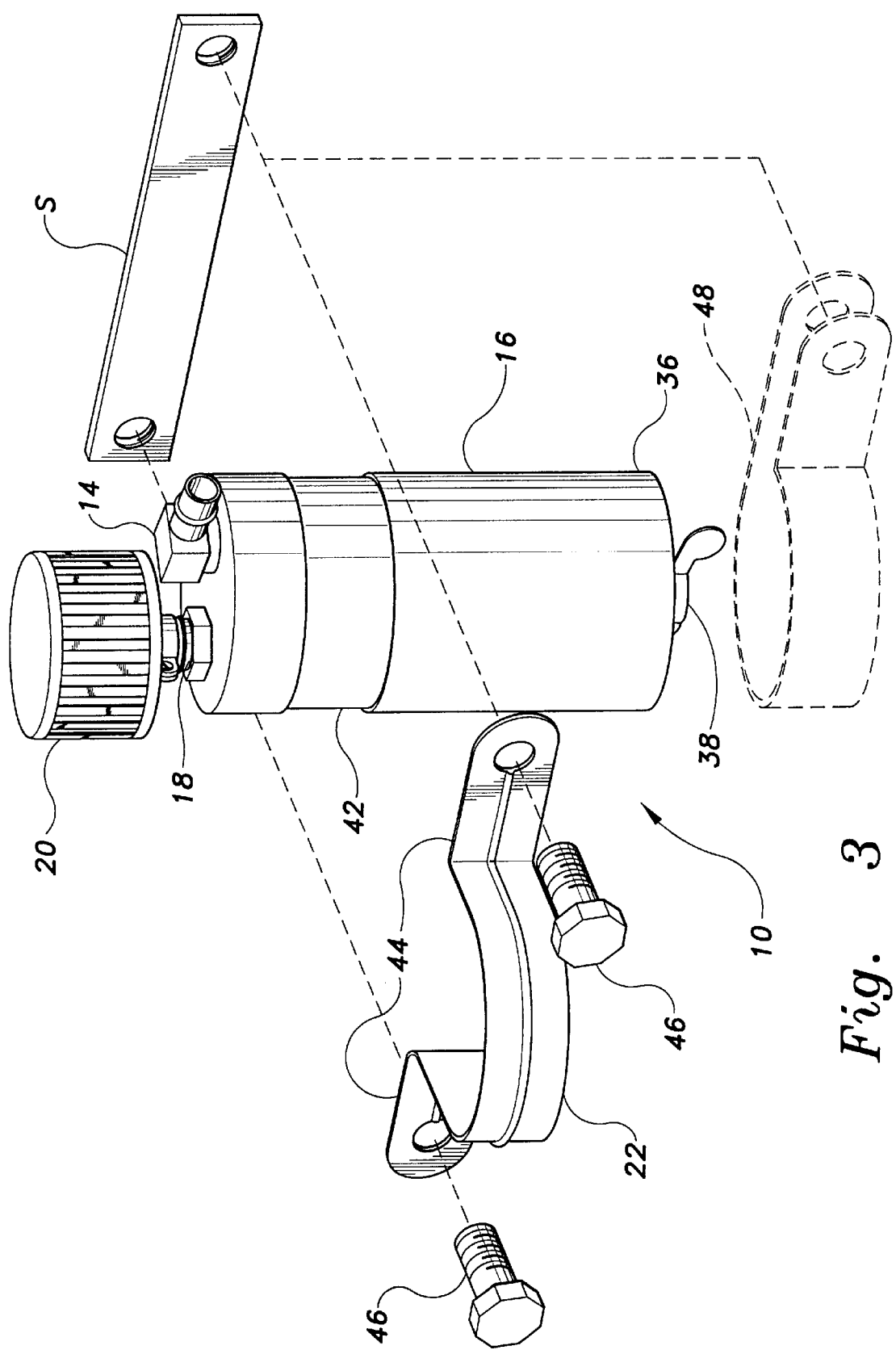
FIG. 3 is an exploded perspective view of the present oil collector, showing the mounting means for securing the collector to a motorcycle or other object.

FIG. 3 illustrates two alternative means of securing the present container 10 to another object. In FIG. 3, the assembled collector 10 is shown with a generally U-shaped clamp 22, similar to the clamp 22 of FIG. 1, which may be secured about the relatively narrow portion or relief 42 about the upper portion of the canister 16. The clamp 22 includes a pair of opposed ears or lugs 44, by which the clamp 22 may be secured to some other structure S (motorcycle frame, etc.) by means of bolts 46 or other suitable means. Alternatively, a wraparound clamp 48 (shown in broken lines in FIG. 3), with both attachment lugs overlying one another, may be used to secure the container 10 to other structure by means of a single bolt or fastener. Other attachment means, not shown, may be provided as desired, according to the specific mounting structure and other considerations.

Figure 4:
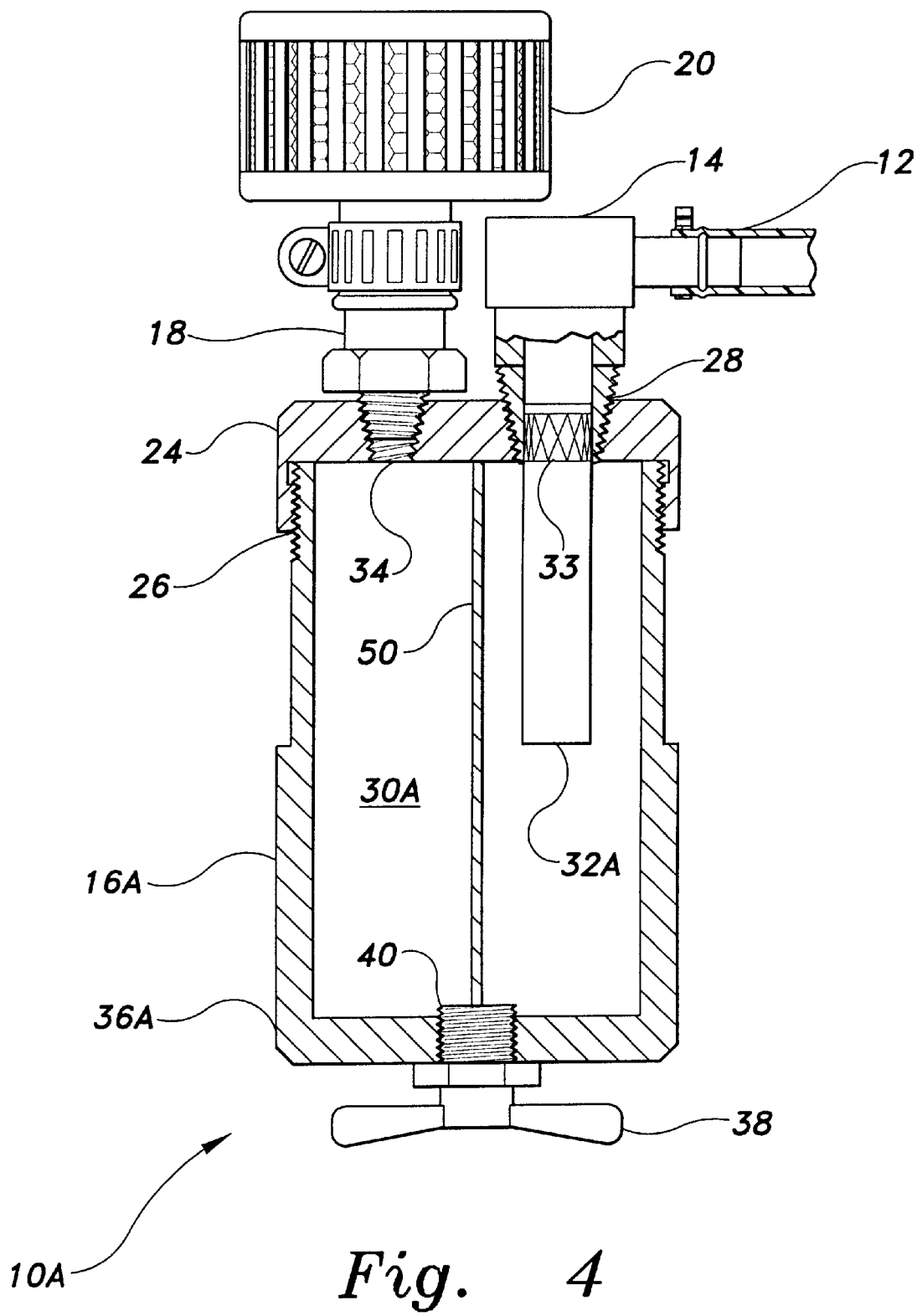
FIG. 4 is an elevation view in section of an alternative embodiment of the device of FIG. 2, showing details thereof.

FIG. 4 illustrates a detailed view of the internal structure of an alternative embodiment of the collector or container 10 of FIGS. 1 through 3, with the collector of FIG. 4 being designated as collector 10*a*. As in the collector 10 of FIGS. 1 through 3, the canister 16*a* is formed of a base portion comprising the main body of the canister 16*a* and a separate upper portion or top 24 being secured to the base portion, as by mating threads 26 or other suitable means. The primary difference between the collector 10 of FIGS. 1 through 3 and the collector 10*a* of FIG. 4, is in the size of the canisters 16 and 16*a* of the two respective embodiments 10 and 10*a*.

As noted further above, the canister 16 of the container 10 of FIGS. 1 through 3 has a depth of about three inches and an internal volume of about two and three eighths fluid ounces, neglecting the volume disposed by various internal components. While the canister 16*a* of the collector 10*a* of FIG. 4 has a diameter substantially the same as that of the canister 16 of the collector 10 of FIGS. 1 through 3, the depth is somewhat less, with the canister 16*a* of FIG. 4 having an internal depth of only about two and one quarter inches, or some twenty five percent less than the three inch depth of the canister 16 of FIGS. 1 through 3. (As in the collector 10 shown in FIG. 2 of the drawings, the collector 10*a* of FIG. 4 is shown larger than actual scale, for clarity in the drawing Figure.) Thus, the internal volume is correspondingly less in the canister 16*a* of FIG. 4, which has an internal volume on the order of about one and three quarter fluid ounces. This still provides a sufficient volume to contain blowby oil from at least a few hours of engine operation of the typical large motorcycle, with the smaller canister 16*a* of FIG. 4 typically requiring service and draining no more than every several hours of operation.

In other respects, the collector 10*a* of FIG. 4 is substantially the same as the collector 10 of FIGS. 1 through 3, with the elbow type inlet fitting 14 passing through an appropriately configured passage in the top 24 of the canister 16*a* (e.g., tapered pipe threads 28, etc.) to provide communication between the breather tube or line 12 and the hollow interior 30*a* of the canister 16*a*. The pipe 32*a* may have knurling 33 about its upper end to provide a more secure grip within the internal passage of the elbow inlet fitting 14, as shown in FIG. 4.

The internal inlet pipe 32*a* will be seen to have a somewhat larger diameter in the collector 10*a* of FIG. 4, thus providing less restriction and better "breathing" for the passage of oil vapor and blowby into the interior 30*a* of the collector 10*a*. (It will be seen that such a larger inlet pipe 32*a* may be installed in the collector 10 of FIGS. 1 through 3, if so desired.) As in the case of the inlet pipe 32 of the collector 10, the inlet pipe 32*a* extends downwardly into the interior 30*a* of the canister 16*a*, to about one half the height or depth of the canister 16*a*. This delivers the blowby gases and entrained oil to the interior 30*a* of the canister 16*a*, at a point well removed from the internal opening 34 to the upper outlet pipe 18, to reduce substantially the amount of oil vapor which remains in the blowby gases as they travel through the canister 16*a*.

Further separation of the blowby gases and oil vapor from the outlet pipe 18 may be provided by a generally vertically disposed baffle 50 installed generally diametrically within the interior volume 30*a* of the canister 16*a* and between the inlet fitting 14 and outlet opening 34, if so desired. The baffle 50 is configured to have a width providing a close fit across the interior of the canister 16*a*, and extending from the inside of the top 24 downwardly to the interior of the bottom end 36*a* of the canister 16*a*. Vapor and liquid oil may still flow from the inlet side to the outlet side of the canister interior by passing around the threads of the drain passage 40 installed in the bottom 36*a* of the canister 16, and through the open interior end of the passage through the petcock 38 beneath the lower edge of the baffle 50. It will be seen that a similar baffle (not shown) may be installed in the collector 10 of FIGS. 1 through 3, if so desired, with the only difference between such a baffle and the baffle 50 of FIG. 4, being the taller length or height of such a baffle for the taller or deeper collector 10.

The collector 10*a* of FIG. 4 functions essentially identically to the collector 10 of FIGS. 1 through 3, with the only substantial difference being the shorter height or depth of the collector 10*a*. Accordingly, a detailed description of the operation and function of the collector 10*a* of FIG. 4, need not be repeated here. The collector 10*a* is also equipped with an outlet filter 20, for capturing any oil vapor droplets which may exit the outlet pipe 18 and for precluding the entry of foreign matter (dust, etc.) back into the breather system when the engine is shut down. When the collector 10*a* has collected a substantial amount of oil after a few to several hours of engine operation, the collected oil is drained from the canister 16*a* by a petcock 38, essentially the same as the petcock 38 of the container 10 of FIGS. 1 through 3, for appropriate disposal. The emptied container 10*a* is then ready for the collection of breather oil vapor from a few to several hours more engine operation, with no further attention being required between periodic draining.

In summary, the present crankcase breather oil collector provides a labor saving device which also serves to assist somewhat in reducing pollution and contamination to the environment. Most motorcyclists are justifiably proud of their machines, and spend considerable amounts of time in maintaining their motorcycles in pristine condition. The oil expelled by a crankcase breather will collect on every surface which is downwind of the breather outlet, thus not only creating a thin film of oil on those surfaces, but also collecting dust and road grime which becomes trapped by the oil film. This can occur after a relatively short ride, and may require a motorcyclist to spend as much time, or more, cleaning his or her motorcycle as he or she does riding the machine.

Accordingly, the capture of crankcase breather oil by the present invention will result in a considerable savings of labor by the motorcyclist, as the motorcycle will be considerably easier to keep clean by eliminating the thin film of waste oil which would otherwise contaminate the machine. Also, the present oil collector will be seen to be useful in assisting to protect the environment, by reducing oil spillage onto the underlying pavement or other surface, and into the atmosphere, during operation of the motorcycle. The petcock drain valve permits residual oil collected within the canister to be drained periodically as required, with very little spillage or mess. In the event that the container or any of its fittings becomes clogged by sludge, the removable threaded top of the canister allows access to the interior of the canister for flushing and cleaning all components as required.

As very little differential pressure is created by the crankcase pressure within the canister of the present collector, due to the relatively low resistance of the outlet filter thereon, the present collector may be constructed from virtually any suitable materials, regardless of their strength (plastic, etc.) so long as the materials are not soluble in petroleum products.

However, as noted further above, many motorcyclists take great pride in the appearance of their machines, and as such, the present oil collector and its fittings may be formed of such materials as chromed or stainless steel, polished aluminum, polished brass, etc., as desired, in order to provide a bright and highly attractive finish.

While the present oil collector is extremely well suited for use with motorcycles, and particularly larger motorcycles, it will be seen that it is also adaptable to virtually any four stroke cycle reciprocating internal combustion engine which has not been previously equipped with some means of collecting or recycling the crankcase blowby gases. Such engines include many stationary power generators, as well as certain smaller off road vehicles which may use four stroke engines but which are not required to meet any particular emissions requirements. Accordingly, the present invention will find wide acceptance in the motorcycling industry and hobby, as well as in other fields where such engines are used.

It is to be understood that the present invention is not limited to the embodiments described above, but encompasses any and all embodiments within the scope of the following claims.

I claim:

1. A crankcase breather oil collector for collecting oil from crankcase blowby gases released into the atmosphere from a four stroke reciprocating internal combustion engine, comprising:

a canister having a removal top including an inlet and an outlet, and a bottom portion, said inlet and said outlet of said removable top for passing the crankcase blowby gases therethrough and said bottom portion for collecting the oil from the blowby gases, and said bottom portion having a selectively openable and closable drain valve installed therein for periodically draining the collected oil from said canister for disposal thereof;

a filter external of said canister, said filter being removably attached to said outlet, said filter capturing significant particulate matter from the blowby gases and also precluding the entrance of atmospheric contaminants into said canister; and a tube connecting said inlet of said canister with the crankcase of the engine, for passing the blowby gases and oil vapor mixed therewith from the crankcase to the canister.

2. The crankcase breather oil collector according to claim 1, wherein said canister has an interior with a depth, with said inlet of said canister having an inlet pipe extending into said interior of said canister, with said inlet pipe including a distal end disposed within said canister about one half of said depth of said interior of said canister.

3. The crankcase breather oil collector according to claim 1, wherein said canister includes an interior with a planar baffle disposed generally vertically therein and generally between said inlet and said outlet.

4. The crankcase breather oil collector according to claim 1, including attachment clamp means selected from the group consisting of a generally U-shaped clamp having opposite attachment lugs extending therefrom, and a wraparound clamp having first and second overlying attachment lugs.

5. The crankcase breather oil collector according to claim 1, wherein said canister has an internal diameter of 1.35 inch and an internal height ranging from two and one quarter inches to three inches.

6. The crankcase breather oil collector according to claim 1, wherein at least said canister is formed of materials selected from the group consisting of petroleum resistant plastics, chrome plated steel, stainless steel, polished aluminum, and polished brass.

7. A motorcycle crankcase breather oil collector for collecting oil from crankcase blowby gases released into the atmosphere from a four stroke reciprocating internal combustion engine of a motorcycle, comprising:

a canister having a removal top including an inlet and an outlet, and a bottom portion, said inlet and said outlet of said removable top for passing the crankcase blowby gases therethrough and said bottom portion for collecting the oil from the blowby gases, and said bottom portion having a selectively openable and closable drain valve installed therein for periodically draining the collected oil from said canister for disposal thereof;

a filter external of said canister, said filter being removably attached to said outlet, said filter capturing significant particulate matter from the blowby gases and also precluding the entrance of atmospheric contaminants into said canister; and a tube connecting said inlet of said canister with the crankcase of the motorcycle engine, for passing the blowby gases and oil vapor mixed therewith from the crankcase to the canister.

8. The motorcycle crankcase breather oil collector according to claim 7, wherein said canister has an interior with a depth, with said inlet of said canister having an inlet pipe extending into said interior of said canister, with said inlet pipe including a distal end disposed within said canister about one half of said depth of said interior of said canister.

9. The motorcycle crankcase breather oil collector according to claim 7, wherein said canister includes an interior with a planar baffle disposed generally vertically therein and generally between said inlet and said outlet.

10. The motorcycle crankcase breather oil collector according to claim 7, including attachment clamp means selected from the group consisting of a generally U-shaped clamp having opposite attachment lugs extending therefrom, and a wraparound clamp having first and second overlying attachment lugs.

11. The motorcycle crankcase breather oil collector according to claim 7, wherein said canister has an internal diameter of 1.35 inch and an internal height ranging from two and one quarter inches to three inches.

12. The motorcycle crankcase breather oil collector according to claim 11, wherein at least said canister is formed of materials selected from the group consisting of petroleum resistant plastics, chrome plated steel, stainless steel, polished aluminum, and polished brass.

* * * * *